July 10, 1923.
A. J. BORST, JR
1,461,378
ANTISKID DEVICE FOR VEHICLE WHEELS
Filed July 12, 1918
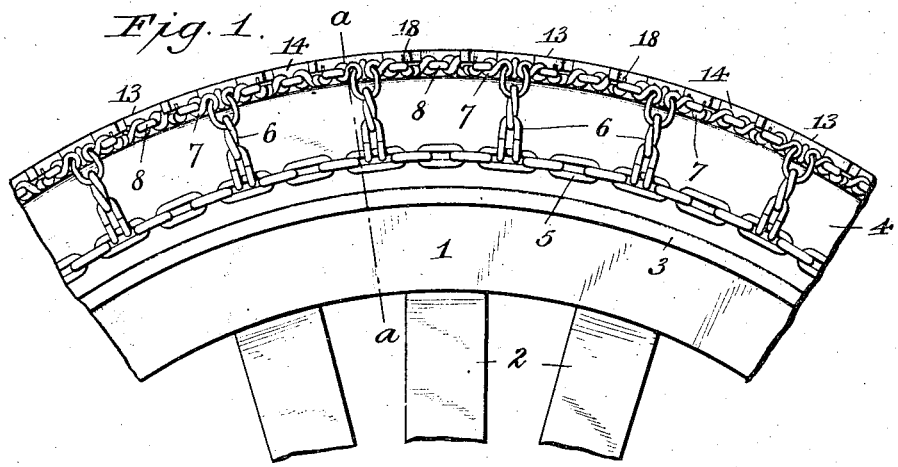
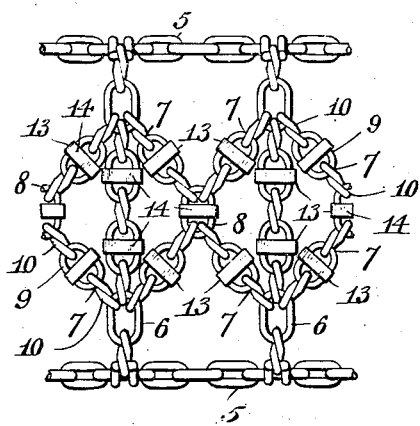
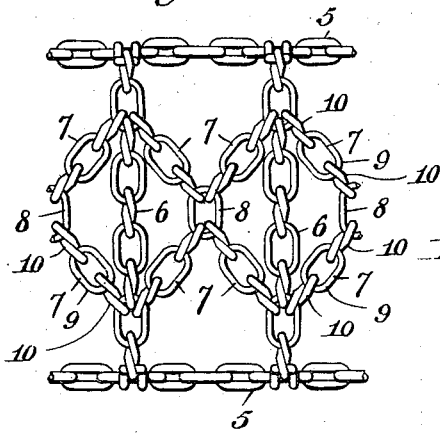
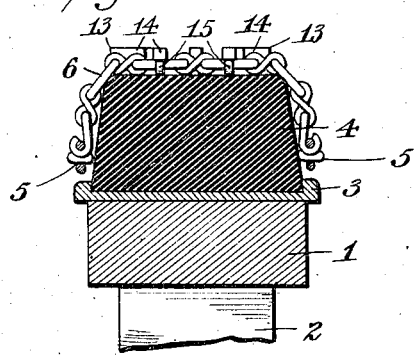
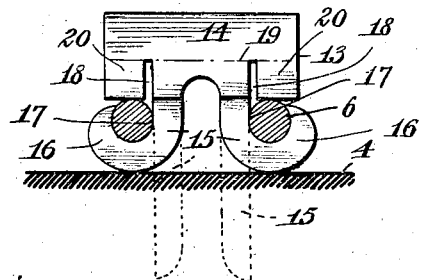
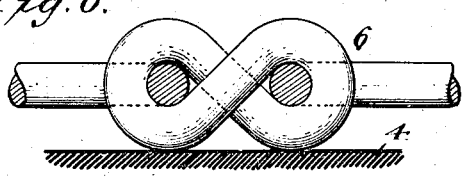
Witness:
Jacob Obrist Jr.
Andrew J. Borst, Jr. Inventor.
By Emil Neubach
Attorney.

Patented July 10, 1923.

1,461,378

UNITED STATES PATENT OFFICE.

ANDREW J. BORST, JR., OF BUFFALO, NEW YORK.

ANTISKID DEVICE FOR VEHICLE WHEELS.

Application filed July 12, 1918. Serial No. 244,557.

*To all whom it may concern:*

Be it known that I, ANDREW J. BORST, Jr., a citizen of the United States, residing at Buffalo, in the county of Erie and State of New York, have invented certain new and useful Improvements in Antiskid Devices for Vehicle Wheels, of which the following is a specification.

My invention relates to anti-skid devices for vehicle wheels, and more particularly to a chain tire-grip to be applied to the tires of automobile wheels.

One of the objects of my invention is to so construct the anti-skid device that the tire of the vehicle wheel cannot come in contact with the road surface.

Another object of my invention is the production of a chain anti-skid device having maximum flexibility.

A further object of my invention is the application to the contact or tread sections of the device of removable calks which can be easily replaced when worn.

Further objects are, the provision of an anti-skid device constructed of sections of chains having straight and twisted links arranged alternately on the tread members of the device and having removable calks applied to the straight links of said tread members, said calks extending out beyond the outermost points of the twisted links and being removable and capable of becoming automatically detached from the sections of chains to which they are applied when worn to a pre-determined degree.

With these and other objects in view, the invention consists in the novel features of construction and in the arrangement and combination of parts to be hereinafter described and more particularly pointed out in the subjoined claims.

In the drawings:—

Fig. 1 is a side elevation of a portion of a vehicle wheel, illustrating the manner of applying my improved anti-skid device thereto.

Fig. 2 is a fragmentary plan view of the device.

Fig. 3 is a similar view with the removable calks omitted.

Fig. 4 is a cross section taken on line $a$—$a$, Fig. 1,

Fig. 5 is a transverse section through one of the chains showing one of the removable calks applied thereto.

Fig. 6 is an enlarged longitudinal section through a portion of one of the tread members of the device.

Having reference now to the drawings in detail, the numeral 1 designates the felloe of a vehicle wheel, 2 the spokes, 3 the tire rim, and 4 the tire applied to said rim. The tire shown is of the solid type, such as used on trucks, but obviously this device may be applied to any form of vehicle wheel, whether equipped with a solid, pneumatic, or other tire; the drawings simply showing in an illustrative manner the way in which the anti-skid device is employed, it being understood that the device may be retained on the wheel in any approved manner.

The chain structure of my improved anti-skid device can be used with or without my improved calks, or "supplemental gripping elements" as they may be termed, and it comprises two side chains 5, which, when the device is applied to a vehicle wheel, lie at opposite sides of the tire or the felloe, the exact position of these chains varying on wheels of different widths. It may, however, be said that these chains are adapted to lie at opposite sides of the marginal portion of the vehicle wheel.

Connecting the side chains 5 are cross chains 6, these being spaced apart at regular intervals along the lengths of the side chains. Between the cross chains, diagonally-arranged tie-chains 7 are provided which have their outer ends connected to links of the adjacent cross chains and their inner ends connected to a single centrally-arranged link 8. Each of the cross chains and the diagonal chains have straight and twisted links arranged alternately. In the particular construction shown, each of the diagonal chains 7 comprises a central straight link 9 and two end twisted links 10, the twisted links at opposite ends of the diagonal chains being secured respectively to straight links of the cross chains and to the central link, which is also straight or untwisted.

The cross and diagonal chains may be termed the tread or gripping chains or elements of the device, and the diagonal chains radiating from the central link 8 positioned between the adjacent cross chains may be termed radiating chains connecting a link common to all with the adjacent cross chains. It is to be noted that the diagonal chains are comparatively short and do not extend outwardly to the side chains, the purpose of the same being merely to lie in contact with that portion of the tire which would ordinarily come in contact with the road surface, thereby reducing the cost of production and diminishing the weight of the device.

The chain structure thus far described, while flexible to a high degree, prevents the cross chains 6 from sagging unduly at low points of the vehicle wheel out of contact with the road surface, and thus eliminates considerable noise during the rotation of the wheel. With the stretches of chains arranged between the side chains 5, as described, the tire is kept out of contact with the road surface.

It will be obvious upon examination of Fig. 6 that the alternate straight links of the tread chains do not ordinarily come in contact with the road surface, and when the device is properly applied to a vehicle wheel will not come in contact with the tread of the wheel.

When applied to trucks or other vehicles adapted to carry heavy loads, or for vehicles traveling along muddy roads, I preferably apply to the tread chains of the chain structure, removable calks or gripping elements 13, these being applied to the straight links of the cross chains 6 and of the diagonal chains 7, one calk or gripping element being also applied to each of the centrally-disposed links 8 to which the inner ends of each set of diagonal chains is applied. Each of these calks comprises a solid elongated body portion 14 adapted with its inner face to bear against the opposite side bars or members of the straight link to which it is applied and a pair of spaced prongs 15 which are normally parallel, as shown with dotted lines in Fig. 5. These prongs are passed through one of the straight links and by means of a suitable tool are bent or curved around the opposite bars of the link, as shown at 16 in Fig. 5, the outer faces of the prongs being preferably in contact with the opposite bars of said straight link, as at 17, so that there will be no play laterally with respect to the link to which it is applied.

Each of the calks or gripping elements 13 is provided with transverse slots 18 which extend inwardly from the inner face of the body portion to a line designated 19 in Fig. 5. The depth of these slots may, of course, be varied but in any event they are preferably of equal lengths.

When the outer portions of the calks become worn away to the slots 18, the remainder of the body portion of the calk will be divided into three separate and distinct parts. The portions 20 lying outside of the slots will then fall away, and the remainder of the calk retained by the curved prongs, or that part of the body portion between the slots, will automatically loosen itself from the chain during the rotation of the wheel and when reaching a loose portion of the chain, will become detached from the chain. If, however, the prongs are found to hold the remaining portion of the calk securely to the chain, no difficulty will be encountered in removing said remaining portion by the use of a suitable tool.

By applying the calks to tread chains arranged at an angle to each other, or in other words, to chains trending in different directions, the sides of the calks are arranged at different angles and are obviously more effective against skidding than if applied to the chain structure in the same direction. Moreover, the calks are of a height to prevent any of the links of the tread chains coming in contact with the road surface, except when traveling over soft roads in which the calks become embedded. And furthermore, with calks applied to the cross chains as well as the diagonal chains and spacing them as shown in Fig. 2 of the drawings, a practically even contact surface is provided for the device, as shown in Fig. 1, yet comparatively large spaces intervene between the calks so that the latter will easily grip the road surface, as the comparatively large spaces between the calks allow the calks to become embedded in the road surface under the weight of the vehicle. The calks therefore save the chains and furnish a more secure gripping action than can be derived from the links of the chains. The curved portions of the prongs provide bearing points for the tread chains between adjacent twisted links, thereby furnishing greater bearing surface for the device against the tire to which it is applied.

By securing a calk to each of the centrally arranged links connecting the diagonally arranged tie chains 7 and providing each of said tie chains with a calk and also providing the cross chains 6 with calks, an even contacting surface is provided with the minimum number of calks and the maximum number of spaces between the calks.

By passing the prongs of the calks or gripping members through the links and curving them underneath and around the outer sides of the opposite side bars thereof, the tendency under the weight of the vehicle is to tighten these prongs around said side bars; this being also true of any side thrust or twisting strains applied to the calks, such as are caused by the tendency of the vehicle to skid. Obviously my improved calks may be applied to anti-skid chain structures different from the chain structure herein shown and described, but in combining the removable calks with a chain structure of the type described, advantages are secured that are not possible by combining the calks with chain structures now known.

It is to be understood that since the calks or gripping elements 13 are detachably applied to the chain structure, said structure may be used with or without the calks but, as stated, for trucks or other vehicles adapted to carry heavy loads, or for vehicles traveling along muddy roads the use of the calks are desirable. The desirability of the use of the calks therefore depends more or less on the kind of vehicle to which the device is applied, and also more or less upon the kind of roads over which the vehicle travels, and when the calks are not used or in the event that they are worn down and become loosened or detached from the chain structure, the arrangement of having a straight link between two twisted links will be of considerable advantage, since the twisted links are enabled to take a firmer hold of icy surfaces and more effectively crack or break up the surface than is possible with tread chains constructed solely of twisted links or solely of straight links, thus giving the tread chains a more secure gripping action than would otherwise be possible.

Having thus described my invention, what I claim is:—

1. An anti-skid device for vehicle wheels, comprising a chain structure having tread chains, removable gripping elements secured to links of said tread chains, each gripping element comprising an elongated body portion and prongs passed through one of said links and curved around the opposite side bars thereof, and means embodied in the structure of said body portion to cause the calk to be easily removed from said link when worn to a certain extent.

2. An anti-skid device for vehicle wheels, comprising a chain structure, and a plurality of gripping elements secured to said chain structure and embodying means to permit self detachment of each gripping element when the body portion thereof is worn to a pre-determined extent.

3. An anti-skid device for vehicle wheels, comprising a chain structure having tread chains, and gripping elements removably secured to said tread chains, each gripping element comprising a body portion having a slot extending into the body portion from its inner face, and prongs adapted to be fastened to a link of one of said tread chains.

4. An anti-skid device for vehicle wheels, comprising a chain structure having tread chains, and removable gripping elements secured to said tread chains, each gripping element comprising a body portion having a pair of spaced slots extending thereinto from the inner face thereof and securing prongs extending from said inner face and adapted to be secured to one of said tread chains.

5. An anti-skid device for vehicle wheels, comprising a chain structure having side chains and tread chains between said side chains, a removable gripping element secured to each tread chain, each gripping element comprising an elongated body portion having a pair of spaced slots extending thereinto from the inner face thereof and a pair of prongs extending inwardly from said inner face between said pair of slots, said prongs being adapted to be passed through a link of a tread chain.

6. An anti-skid device for vehicle wheels, comprising two side chains, cross chains connecting said side chains, a set of diagonal chains between adjacent cross chains and having connection at their outer ends with said cross chains, a centrally-disposed link connecting the inner ends of the diagonal chains of each set together, said cross chains and diagonal chains having twisted and straight links arranged alternately, and a gripping element secured to each centrally-disposed link and to each straight link of each diagonally arranged chain and each cross chain.

7. An anti-skid device for vehicle wheels, comprising a chain structure having tread chains formed of straight and twisted links arranged alternately, and calks secured to each straight link of said tread chains, each calk having inwardly projecting prongs curved around the opposite side bars of a straight link and having the curved portions in contact with the peripheral face of the vehicle wheel, said twisted links being also in contact with the peripheral face of said vehicle wheel and said calks extending outwardly beyond the outermost points of said twisted links.

8. An anti-skid device for vehicle wheels, comprising two parallel chains, cross chains connecting said parallel chains, a set of diagonal chains between adjacent cross chains having connection at their outer ends with said cross chains, and a centrally-disposed link connecting the inner ends of the diagonal chains of each set together, said cross chains and diagonal chains having twisted and straight links arranged alternately.

9. An anti-skid device for vehicle wheels, comprising two parallel chains, cross chains connecting said parallel chains, a set of diagonal chains between adjacent cross chains having connection at their outer ends with said cross chains, and a centrally-disposed link connecting the inner ends of the diagonal chains of each set together, said cross chains having twisted and straight links arranged alternately.

10. An anti-skid device for vehicles having tread members in the form of chains disposed in different directions, each chain having twisted and straight links arranged alternately with a twisted link at the end of each chain, connected to a straight link of another chain.

11. An anti-skid device for vehicle wheels comprising a chain structure having tread chains, each tread chain being formed of straight and twisted links arranged alternately, and calks applied to the straight links of said tread chains along the road-contacting region of the wheel.

In testimony whereof I affix my signature.

ANDREW J. BORST, Jr.